March 14, 1961 E. M. GRANDINETTI 2,974,887
SALT SHAKER AND PEPPER MILL
Filed Jan. 25, 1960
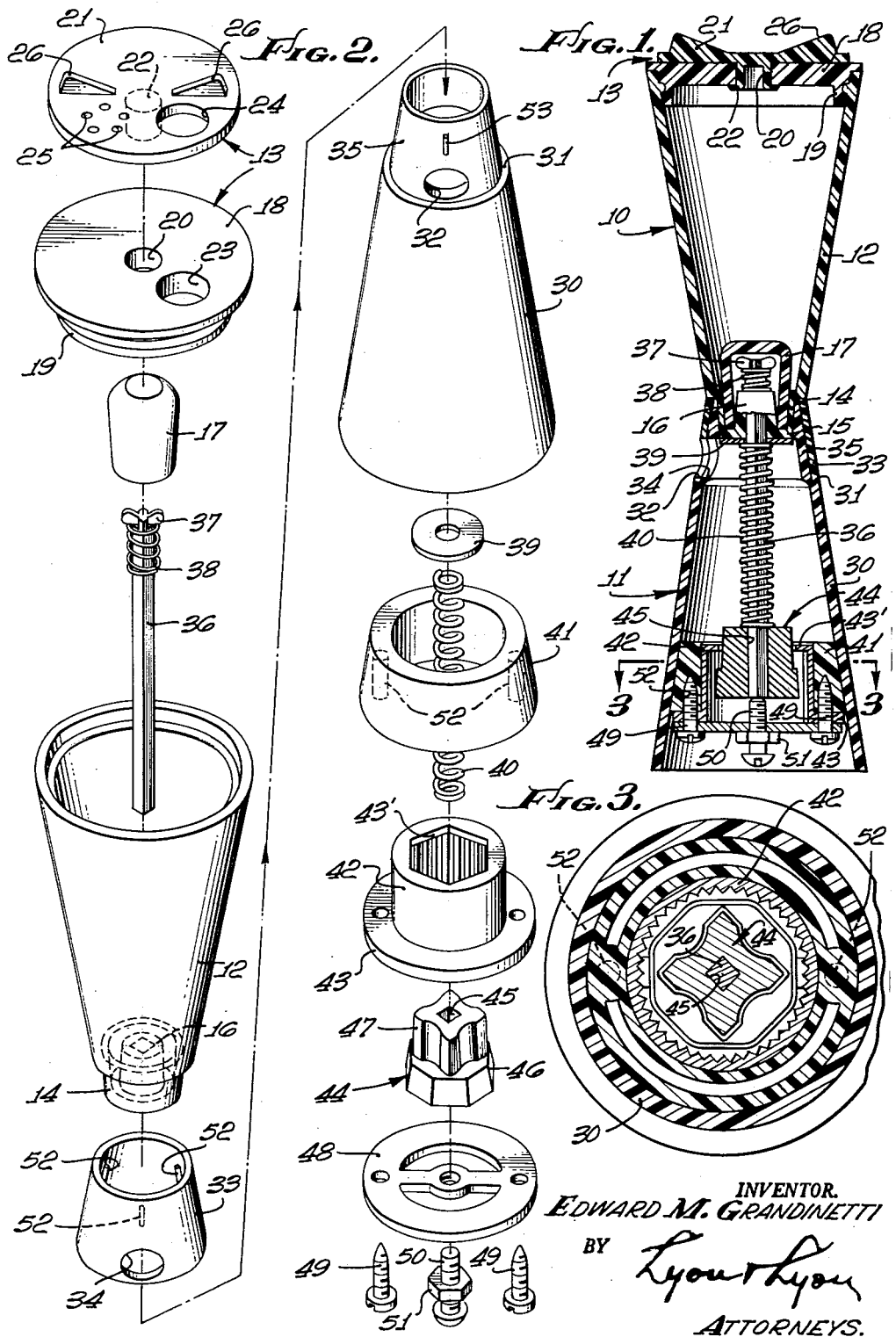
INVENTOR.
EDWARD M. GRANDINETTI
BY Lyon & Lyon
ATTORNEYS.

2,974,887
SALT SHAKER AND PEPPER MILL

Edward M. Grandinetti, 7859 Via Amorita,
Downey, Calif.

Filed Jan. 25, 1960, Ser. No. 4,528

1 Claim. (Cl. 241—101)

This invention relates to a salt shaker and pepper mill and more particularly to a unitary structure forming both a salt shaker and pepper mill grinder wherein the grinder rotor is spring mounted and adjusts for smooth grinding and grind choice.

It is accordingly one object of this invention to provide such a combination salt shaker and pepper mill which is simple and economic to build and easy to assemble.

It is a further object of this invention to provide a device of the type described which is rugged and durable and which, once assembled, cannot be disassembled.

It is a further object of this invention to provide in such a pepper mill a grinder rotor which is spring biased toward the stator and adjustable as shown.

These and other objects, features and advantages will be apparent from the annexed specification in which:

Figure 1 is a vertical section taken centrally through a device embodying the present invention;

Figure 2 is an exploded perspective of the various parts thereof in the order in which they appear; and Figure 3 is a section taken along the line 3—3 of Figure 1.

Referring now more particularly to the drawings, the device is shown as comprising two sections, an upper salt shaker forming section 10 and a lower pepper mill section 11. The upper section 10 includes a generally cone shaped body 12 and a lid 13. The body 12 is molded from a plastic material and has a bottom in the form of a downwardly extending cylindrical member 14 having a bottom wall 15 and an upwardly extending boss 16. A square hole extends through the boss 16 and wall 15. A cap 17 fits in the annular space between boss 16 and cylinder 14, and on final assembly is cemented therein. Lid 13 is formed of two pieces; a plate 18 having a downwardly extending flange 19 and a central hole 20 and a plate 21 carrying a boss 22 which is peened over to rotatably mount plate 21 on plate 18. Plate 18 has a hole 23 and plate 21 a hole 24 which may be aligned to fill the salt shaker. Plate 21 also has salt dispensing holes 25 and finger tabs 26. On final assembly plate 18 is cemented in the top of body 10.

Lower pepper mill section 11 also comprises a generally conical body 30 having a shoulder 31 adjacent which is formed a hole 32. A frusto-conical piece 33 having a hole 34 adapted to align with hole 32 to fill the pepper mill with peppercorns rotatably rides on shoulder 31.

Three projections 52 evenly spaced, are molded on the inner surface of piece 33. A single projection 53 is formed on the outer surface of the upper portion 35 of conical body 30. These projections prevent 350° turning of piece 33 and prevent alignment of holes 32 and 34 unless hand operated.

Adjacent its upper end body 30 has a section 35 having its inner wall cylindrical to mate with cylindrical member 14 for joint rotation.

A square shaft 36 extends through square hole in boss 16 and bottom wall 15, has its upper end upset as at 37 to retain thereon a coil spring 38. A washer 39 surrounds shaft 36 and bears against the lower side of wall 15, being urged against it by a coil spring 40 which is mounted on shaft 36.

A retainer 41, frusto-conical in form and having screw holes 52 therein is cemented in body 30 as indicated. The interior of retainer 41 is right-cylindrical and receives cylindrical extension 42 of stator 43. The upper end of extension 42 has an inwardly extending hexagonal flange 43'. The inner wall of extension 42 is serrated. A rotor 44 having a square hole 45 therein is mounted on shaft 36 having a section 46 in the form of a tapering hexagon and an extension 47 in the form of a scalloped square. Rotor 44 fits in stator 43 and is retained therein by a plate 48 attached to retainer 41 by screws 49. Coil spring 40 engages the top of rotor 44 and an adjusting screw 50 bears against the underside of rotor 44 and is set by nut 51.

In operation if salt is desired the operator moves plate 21 to align salt holes 25 with hole 23 and uses the device as a salt shaker. Piece 33 should be rotated to close hole 32. If pepper is desired body 12 is rotated with respect to body 30, thus turning rotor 44 within stator 43 and grinding peppercorns against the serrated wall of the stator.

Coil spring 40 resiliently biases stator 44 downwardly for smooth grinding while screw 50 and nut 51 serve to adjust the position of the stator to vary the coarseness of grind.

While there has been described what is at present considered the preferred embodiment of the invention, it will be understood that various changes and alterations may be made therein without departing from the essence of the invention and it is intended to cover herein all such changes and alterations as come within the true scope and spirit of the annexed claim.

I claim:

A combined salt shaker and pepper mill grinder comprising: a first, salt dispensing, section; a second, pepper dispensing section; said sections being mounted together for relative rotation; a centrally located shaft disposed partially in each section; a grinder disposed adjacent the open end of said second section including a stator fixedly mounted therein and a rotor carried by said shaft; a coil spring mounted on said shaft and biasing said rotor towards said stator; adjusting means for selectively positioning said rotor on said shaft with respect to said stator; and means sealing off said first from said second sections; said shaft being mounted to rotate with said first section to turn said rotor and activate said grinder on relative rotation of said two sections; said second section having a hole therein and a ring rotatably mounted thereon and having a like hole therein adapted to align with said first hole in one position of said ring to permit loading of said second section with peppercorns to be ground.

References Cited in the file of this patent

UNITED STATES PATENTS

| 526,203 | Schwarzenberger | Sept. 18, 1894 |
| 1,135,017 | Hiller | Apr. 13, 1915 |
| 1,264,134 | Quick | Apr. 23, 1918 |
| 1,931,087 | Schwarz et al. | Oct. 17, 1933 |

FOREIGN PATENTS

| 27,692 | Great Britain | of 1904 |
| 306,013 | Switzerland | June 1, 1955 |